May 6, 1941. H. ARMISTEAD 2,240,899
DISPLAY DEVICE
Filed Dec. 11, 1939 2 Sheets-Sheet 1

INVENTOR
Horace Armistead
BY
ATTORNEY

May 6, 1941.  H. ARMISTEAD  2,240,899

DISPLAY DEVICE

Filed Dec. 11, 1939    2 Sheets-Sheet 2

INVENTOR
Horace Armistead
BY
ATTORNEY

Patented May 6, 1941

2,240,899

UNITED STATES PATENT OFFICE 2,240,899

DISPLAY DEVICE

Horace Armistead, New York, N. Y., assignor of one-half to Leon Rand Warren, New York, N. Y.

Application December 11, 1939, Serial No. 308,577

5 Claims. (Cl. 272—13)

This invention relates to new and useful improvements in a display device construction.

More specifically, the invention proposes the construction of a display device characterized by the provision of a transparent mirror set at right angles to the audience in a manner to act as a screen permitting pictures to be viewed by an audience through an opening formed in a front wall behind which said mirror is set.

Still further it is proposed that the mirror be of the transparent type to permit illuminated pictorial designs to pass therethrough in order to entertain the audience and for advertising purposes.

Still further it is proposed to arrange the pictorial designs behind said transparent mirror so that when the pictorial designs are illuminated the light rays emanating therefrom will cause the mirror to become transparent so that the pictorial designs may be viewed.

Still further it is proposed to provide a means for causing the transparent pictorial designs to be successively illuminated to cause the transparent mirror to function in the manner set forth.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Figure 1:
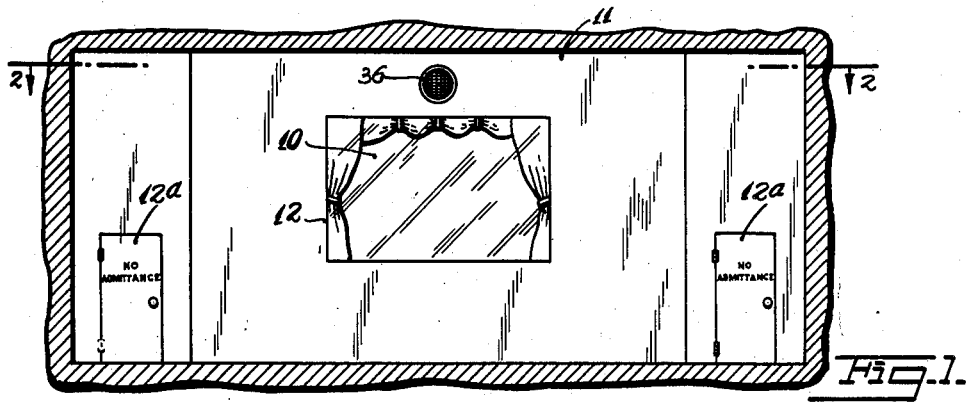
Fig. 1 is an elevational view of a portion of a display device constructed in accordance with this invention.
Figure 2:
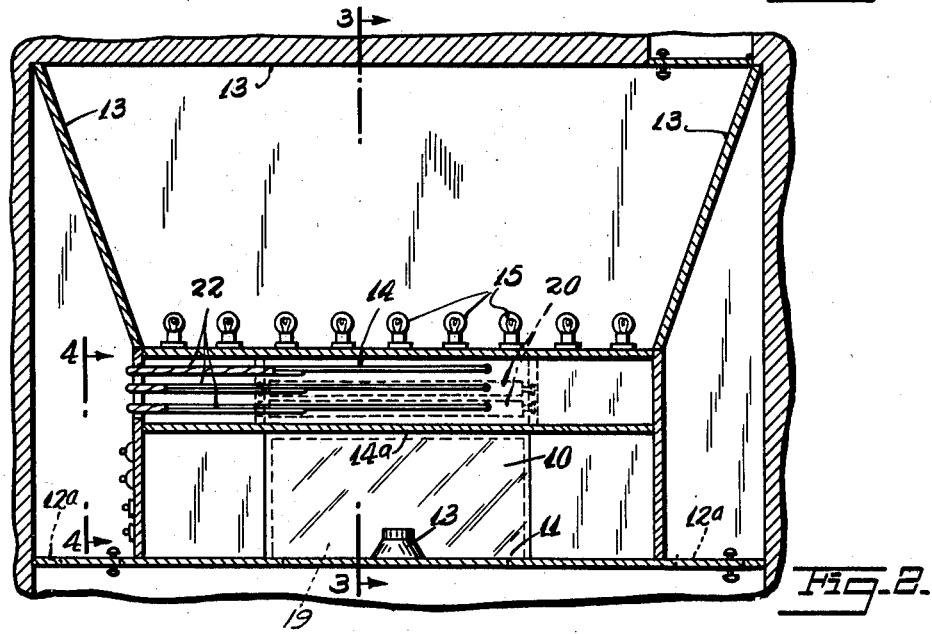
Fig. 2 is a horizontal sectional view taken substantially on the line 2—2 of Fig. 1.
Figure 3:
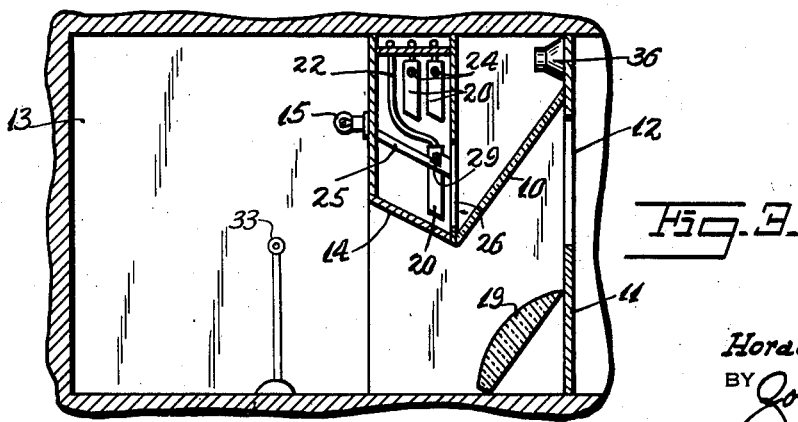
Fig. 3 is a vertical sectional view substantially on the line 3—3 of Fig. 2.
Figure 4:
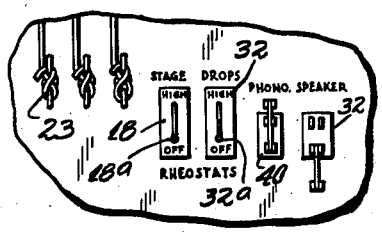
Fig. 4 is a view looking in the direction of the line 4—4 of Fig. 2.
Figure 10:
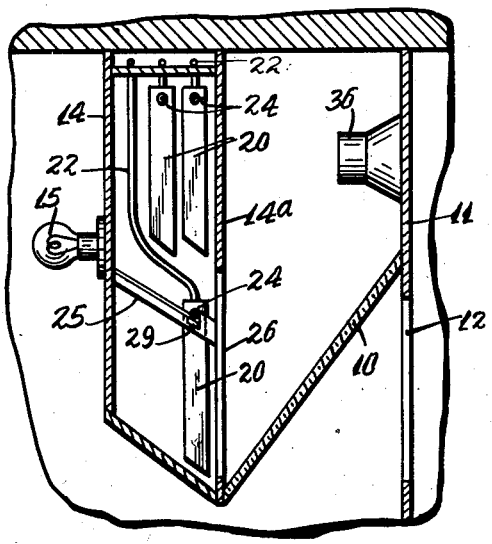
Fig. 10 is an enlarged detailed view similar to a portion of Fig. 3.
Figures 5, 6:
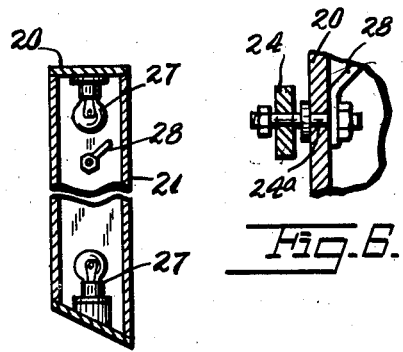
Fig. 5 is a vertical sectional view of one of the pictorial designs per se.
Fig. 6 is a vertical sectional view through one of the rollers of the pictorial design.
Figure 7:
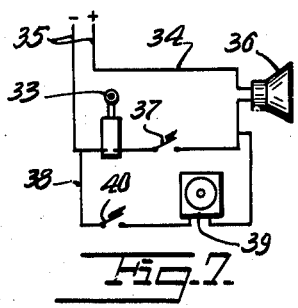
Fig. 7 is a schematic wiring diagram of the sound mechanism.
Figure 9:
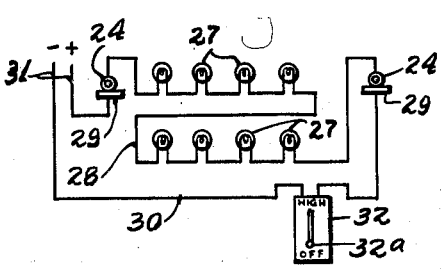
Fig. 9 is a schematic wiring diagram of the lights for illuminating the pictorial design.
Figure 8:
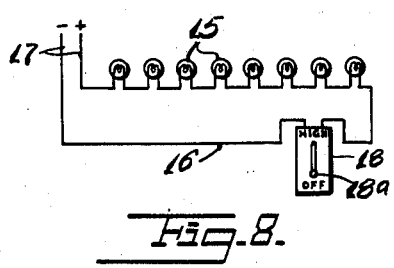
Fig. 8 is a schematic wiring diagram of the stage lights.

The display device, according to this invention, includes a transparent mirror 10 set at right angles to the audience located to the front of a vertical wall 11 located at the front of the theatre 12. This front wall has a stage opening 12 concealing the edge portions of the mirror 10 and through which the people in the audience are adapted to view the face of the transparent mirror. The front wall 11 is also provided with doors 12ᵃ for permitting actors and stage hands to gain access to the area immediately behind the front wall 11.

Stage and background material 13 is positioned to the rear of the front wall 11 and is normally hid from the view by means of a downwardly extending box-like structure 14 extending from the ceiling of the theatre to a position in which its bottom edge is normally in alignment with the bottom edge of the stage opening 12. The box-like structure has a plurality of lamps 15 mounted on the back thereof and which are adapted to illuminate the stage and background material. These lamps 15 are mounted in a circuit 16 including a source of power 17 and a rheostat 18. This rheostat 18 has a control knob 18ᵃ which is adapted to be moved from an off position to a position in which the lamps 15 will be brightly illuminated. This permits the brightness of the lamps to be controlled and also permits the same to be slowly dimmed when desired.

A plano-convex cylindrical reflector mirror 19 is mounted immediately below the transparent mirror 10 and is adapted to reflect the stage and background material and the action of the players to the transparent mirror 10 from where it will be reflected through the stage opening 12 to be viewed by the audience.

A means is also provided for entertaining the audience during intermission periods while the stage setting is being changed and the players are changing their costumes. This is accomplished by means of a plurality of pictorial designs mounted within the box-like structure 14 and which are adapted to be selectively placed behind the transparent mirror 10.

Each of these pictorial designs is alike in construction and comprises a box 20 having an open side across which a transparent member 21 is mounted. This transparent member 21 is imprinted, painted or in any other manner provided with the pictorial design. These boxes are held in a raised position, each by means of a rope 22 which extends into one of the wings of the theatre stage and which is normally engaged upon a hook 23. When the rope 22 of the desired pictorial design is removed from the hook 23 the box 20 attached thereto may be lowered. The sides of each box is provided with rollers 24 which are adapted to rest upon and move along a track 25 mounted on either side of the box-like construction 14. These tracks 25 are arranged at a downwardly inclined slope for causing the boxes 20 to move to a position adjacent the front wall 14ª of the box-like construction 14. When in this position the pictorial design is in alignment with an opening 26 formed in the front wall 14ª of the box-like construction 14.

The interior of each box 20 is provided with a plurality of lamps 27 which are adapted to be illuminated when the box rests at the lower end of the track 26 for changing the reflecting mirror into a revealing area to permit the pictorial design to be viewed. These lamps 27 are connected by means of wires 28 to the axles 24ª of the rollers 24. These rollers 24 are of metal and are adapted to contact metal inserts 29 mounted in the lower ends of the tracks 25. The remaining portion of the tracks 25 is constructed of wood or similar insulation material.

The metal inserts 29 are mounted in a circuit 30, including a source of power 31 and a rheostat 32. The rheostat 32 is provided with a control knob 32ª for causing the lamps 27 to be turned off or highly illuminated, as desired.

There is also an amplifying system for picking up the spoken words of the players and comprises a microphone or microphones 33 which may be placed at any desired position on the stage. This microphone 33 is mounted in a circuit 34 including a source of power 35 and a speaker 36. The speaker 36 is mounted on the front wall 11 above the stage opening 12. A switch 37 is mounted in the circuit 34 and is adapted to be closed for completing the circuit 34 to cause the spoken words to be carried to the speaker 36. This amplifying system further includes a circuit 38, including the source of power 35, a phonograph 39, and the speaker 36. A switch 40 is mounted in the circuit 38 and is adapted to be closed when the switch 37 is open for connecting the phonograph to the speaker to permit records to be played for entertaining the audience during intermission periods.

The operation of this device is as follows:

The stage is provided with the proper setting and the players assume their positions thereon. The rheostat 32 is moved to its "off" position and the rheostat 18 is moved to a position in which the lamps 15 will be brightly lit to illuminate the stage and background material 13 so that the same and the action of the players may be picked up by the convex reflector 19. From the convex reflector 19 the actions of the players will be reflected in the mirror 10 where it may be viewed by the audience through the stage opening 12. At the end of an act or scene, when it is desired to change the stage setting, the rheostat 18 is moved to a position in which it will dimly light the stage, providing a sufficient amount of light to permit the stage hands to complete their work.

During this time the rheostat 32 is moved to supply a maximum amount of electricity to the metallic inserts 29 on the tracks 25. The desired pictorial design is then lowered, and when the rollers 24 come in contact with the inserts 29 the lamps 27 will be illuminated to cause the back of the transparent mirror to be illuminated and change the mirror 10 into a revealing area through which the pictorial designs may be viewed. At this time the switch 37 is opened and the switch 40 is closed for connecting the phonograph 29 to the speaker 36 to permit records to be played for entertaining the audience.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a device of the class described, a transparent mirror set at an angle to the audience, a front wall having a stage opening and hiding the edge portions of said mirror, a plurality of transparent pictorial designs or other subject material adapted to be selectively placed behind said transparent mirror, and means for illuminating said transparent pictorial designs, each of said transparent pictorial designs being extended across the open side of a box-like construction and said means for permitting said transparent pictorial designs to be selectively placed behind said mirror, comprising a rope for each of said boxes for normally holding said boxes in a position above said mirror and usable for lowering said boxes to rest upon tracks mounted behind said mirror.

2. In a device of the class described, a transparent mirror set at an angle to the audience, a front wall having a stage opening and hiding the edge portions of said mirror, a plurality of transparent pictorial designs or other subject material adapted to be selectively placed behind said transparent mirror, and means for illuminating said transparent pictorial designs, each of said transparent pictorial designs being extended across the open side of a box-like construction and said means for permitting said transparent pictorial designs to be selectively placed behind said mirror, comprising a rope for each of said boxes for normally holding said boxes in a position above said mirror and usable for lowering said boxes to rest upon tracks mounted behind said mirror, said means for illuminating said transparencies comprising a plurality of lights mounted within each of said boxes, rollers at the sides of said boxes and engageable with metallic inserts formed in said tracks, wires connecting said lamps to said rollers, and a circuit including a source of power, a rheostat and said metallic inserts to cause said lamps to be illuminated when said rheostat is moved to its "on" position.

3. In a device of the class described, a front wall having a stage opening, a rearwardly and downwardly inclined transparent mirror mounted behind said stage opening, a box-like construction located behind said mirror, a plurality of transparent pictorial designs mounted within the top portion of said box-like construction, tracks mounted on opposite sides of said box-like construction and directed downwards and forwards, means for successively lowering said transparent pictorial designs to rest on said tracks and move along the length thereof to a position immediately in back of said mirror, and means for illuminating said pictorial designs while resting on said tracks to be viewed through said transparent mirror, said transparent pictorial designs being imprinted or painted on a piece of glass mounted across a front opening of a box, said means for lowering, comprising a rope for each of said boxes and having one end securely attached to its respective box and its other end releasibly attached to an adjoining portion of said box-like construction.

4. In a device of the class described, a front wall having a stage opening, a rearwardly and downwardly inclined transparent mirror mounted behind said stage opening, a box-like construction located behind said mirror, a plurality of transparent pictorial designs mounted within the top portion of said box-like construction, tracks mounted on opposite sides of said box-like construction and directed downwards and forwards, means for successively lowering said transparent pictorial designs to rest on said tracks and move along the length thereof to a position immediately in back of said mirror, and means for illuminating said pictorial designs while resting on said tracks to be viewed through said transparent mirror, said transparent pictorial designs being imprinted or painted on a piece of glass mounted across a front opening of a box, said means permitting said pictorial designs to move along said tracks, comprising metallic wheels mounted on the sides of each of said boxes and engageable upon said tracks in the lowered position thereof.

5. In a device of the class described, a front wall having a stage opening, a rearwardly and downwardly inclined transparent mirror mounted behind said stage opening, a box-like construction located behind said mirror, a plurality of transparent pictorial designs mounted within the top portion of said box-like construction, tracks mounted on opposite sides of said box-like construction and directed downwards and forwards, means for successively lowering said transparent pictorial designs to rest on said tracks and move along the length thereof to a position immediately in back of said mirror, and means for illuminating said pictorial designs while resting on said tracks to be viewed through said transparent mirror, said transparent pictorial designs being imprinted or painted on a piece of glass mounted across a front opening of a box, said means permitting said pictorial designs to move along said tracks, comprising metallic wheels mounted on the sides of each of said boxes and engageable upon said tracks in the lower position thereof, said tracks being formed of non-conducting material and having metallic inserts at the front end thereof, said illuminating means, comprising a plurality of lamps mounted in each of said boxes, wires connecting said lamps with the wheels of its respective box, and a circuit including a source of power and said metallic inserts for causing the lamps of one of said boxes to be lit when the metallic wheels of that box engage said metallic inserts.

HORACE ARMISTEAD.